US012564887B2

(12) United States Patent

Hetschel et al.

(10) Patent No.: US 12,564,887 B2

(45) Date of Patent: Mar. 3, 2026

(54) CHANGER DEVICE FOR CLAMPING HEADS

(71) Applicant: HAINBUCH GMBH SPANNENDE TECHNIK, Marbach (DE)

(72) Inventors: Martin Hetschel, Brackenheim (DE); Gerhard Rall, Marbach (DE)

(73) Assignee: HAINBUCH GMBH SPANNENDE TECHNIK, Marbach (DE)

( * ) Notice: Subject to any disclaimer, the term of this patent is extended or adjusted under 35 U.S.C. 154(b) by 455 days.

(21) Appl. No.: 18/457,606

(22) Filed: Aug. 29, 2023

(65) Prior Publication Data

US 2024/0082928 A1 Mar. 14, 2024

(30) Foreign Application Priority Data

Sep. 9, 2022 (EP) ..................................... 22194806

(51) Int. Cl.
   *B23B 31/39* (2006.01)
   *B23B 31/18* (2006.01)
(52) U.S. Cl.
   CPC .............. *B23B 31/39* (2013.01); *B23B 31/18* (2013.01); *B23B 2260/078* (2013.01)
(58) Field of Classification Search
   CPC ..... B23B 31/39; B23B 31/18; B23B 31/1612; B23B 31/16154; B23B 31/16083;
   (Continued)

(56) References Cited

U.S. PATENT DOCUMENTS

| | | | |
|---|---|---|---|
| 5,005,279 A | 4/1991 | Kooiker | |
| 5,087,059 A | 2/1992 | Terwilliger | |
| | (Continued) | | |

FOREIGN PATENT DOCUMENTS

| | | | |
|---|---|---|---|
| CN | 102490152 A | 6/2012 | |
| CN | 103522088 A | 1/2014 | |
| | (Continued) | | |

OTHER PUBLICATIONS

Search Report issued in corresponding European Application No. 22194806.0, with English translation of categories of cited documents, dated Feb. 9, 2023 (9 pages).
(Continued)

*Primary Examiner* — Christopher J. Besler
(74) *Attorney, Agent, or Firm* — FLYNN THIEL, P.C.

(57) ABSTRACT

A changer device for inserting a clamping head into and/or removing the clamping head from the clamping chuck, wherein the clamping head has a plurality of clamping jaws mutually displaceable in a radial direction and which can be mutually subjected to force by the changer device toward or away from one another in the radial direction.

The changer device has a base and a plurality of adjusting elements which are movably attached to the base and which in each case have at least one engagement portion for the application of force onto the clamping jaws.

The changer device has a drive member which is rotatably movable about a central axis relative to the base. The drive member is coupled by a gear mechanism to the adjusting elements such that by a rotational movement of the drive member the adjusting elements can be jointly moved toward or away from one another.

16 Claims, 4 Drawing Sheets

(58) Field of Classification Search
CPC ......... B23B 31/16116; B23B 2260/078; Y10T
483/171; Y10T 279/1993
See application file for complete search history.

(56) References Cited

U.S. PATENT DOCUMENTS

| | | | |
|---|---|---|---|
| 5,272,943 | A | 12/1993 | Edwards |
| 6,983,522 | B2 | 1/2006 | Weller et al. |
| 7,434,302 | B2 | 10/2008 | Hetschel |
| 9,387,539 | B2 | 7/2016 | Hangleiter et al. |
| 9,878,376 | B2 | 1/2018 | Haimer et al. |
| 10,994,343 | B2 | 5/2021 | Hetschel |
| 2004/0206217 | A1 | 10/2004 | Weller et al. |

FOREIGN PATENT DOCUMENTS

| | | | |
|---|---|---|---|
| CN | 103813876 | A | 5/2014 |
| CN | 203817429 | U | 9/2014 |
| CN | 205519734 | U | 8/2016 |
| DE | 19812958 | A1 | 9/1999 |
| DE | 10138343 | A1 | 2/2003 |
| DE | 102004044848 | A1 | 3/2006 |
| DE | 102017201200 | A1 | 7/2018 |
| EP | 0566898 | A2 | 10/1993 |
| EP | 1412116 | B1 | 4/2004 |
| EP | 2570208 | A2 * | 3/2013 ............ B23B 13/12 |
| WO | 2006/027269 | A1 | 3/2006 |

OTHER PUBLICATIONS

International Search Report issued in International Application No. PCT/EP2018/050771, with English translation, date of mailing Apr. 9, 2018 (8 pages).
Written Opinion of International Searching Authority issued in International Application No. PCT/EP2018/050771, date of mailing Apr. 9, 2018 (5 pages).
Office Action issued in Germany Application No. 10 2017 201 200.5, dated Nov. 3, 2017 (6 pages).
Office Action issued in China Patent Application No. 201880008485. 5, with English translation, dated Jul. 28, 2020 (15 pages).

* cited by examiner

40

74A
74B
72
42
8
6
78
52
52
62
60
70
46
50

CHANGER DEVICE FOR CLAMPING HEADS

CROSS-REFERENCE TO RELATED APPLICATION

This claims priority from European Application No. 22194806.0, filed Sep. 9, 2022, the disclosure of which is hereby incorporated by reference in its entirety.

TECHNICAL FIELD

The invention relates to a changer device for clamping heads.

BACKGROUND AND SUMMARY

Such clamping heads, which are handled as intended by a changer device according to the invention, serve for receiving workpieces during machining, in particular during subtractive machining, with a preferably rotating workpiece. Clamping heads which are intended to be replaceable by means of a generic changer device and a changer device according to the invention are characterized by a plurality of clamping jaws which are displaced toward one another during the clamping procedure in order to clamp thereby the workpiece arranged therebetween.

The clamping heads are clamped as intended in a clamping chuck which is generally part of a spindle which rotates during operation. The insertion of the clamping head into the clamping chuck is generally carried out by a force being mutually applied to the clamping jaws by means of a changer device, in particular by the clamping jaws being pushed radially toward one another, with at the same time a compression of resilient intermediate blocks. In this compressed state, they can then be inserted into the clamping chuck. As soon as the mutual application of force onto the clamping jaws is absent, the clamping jaws return into their initial relative radial position in which they are then generally positively secured against separation from the clamping chuck and can then be used for clamping workpieces as intended.

Generic changer devices are generally manually actuated. An example of such a manually actuated changer device is disclosed, for example, in DE 10 2017 201 200 A1.

The physical force required for handling the changer device is relatively high. This is firstly due to the mass of the changer device and the clamping head, but secondly also due to the force which is to be applied and which is required for the aforementioned compression of the clamping head against the force of the resilient intermediate blocks. In the past, therefore, there were many adaptations relative to the transmission of force from the manually actuated handle of the changer device to the adjusting elements of the changer device, which are responsible for the application of force onto the clamping jaws. New models of clamping heads often also require new changer devices.

Since a plurality of different clamping heads are frequently used in industrial manufacturing, it is also usual to provide therefor a plurality of changer devices which, amongst other things, are adapted to the force required for the respective clamping head for the purpose of the compression.

It is the object of the invention to provide a changer device which permits a compression with a reduced expenditure of force and thus reduces the need for changer devices which are adapted to specific clamping heads.

To this end, a changer device which is configured in accordance with generic changer devices for inserting a clamping head into a clamping chuck and/or for removing the clamping head from the clamping chuck is proposed. The changer device is configured to apply force onto a plurality of clamping jaws of the clamping head which can be mutually displaced in a radial direction, toward one another or away from one another in the radial direction.

To this end, the changer device has a central base and a plurality of adjusting elements which are movably attached to the base and which in each case have at least one engagement portion for the application of force onto the clamping jaws. The adjusting elements can be radially displaceable in a purely linear manner. Preferably, however, the adjusting elements are attached to the base so as to be pivotably movable about a tangential axis. Preferably, there are at least three adjusting elements which are movable relative to the base in directions spaced apart by 120°.

The adjusting elements are displaced toward one another when the changer device is actuated and thus via the engagement portion also push the clamping jaws of the clamping head toward one another and thus into the aforementioned compressed state in which it is possible to insert the clamping head into the chuck or to remove the clamping head from the chuck. One possible and preferred design provides that the adjusting elements in each case have at least one engagement portion in the form of a cylindrical pin which engages in a corresponding bore of the clamping jaw. Preferably, the engagement portions have in each case at least two engagement portions in the form of cylindrical pins which extend in parallel.

For the common displacement of the adjusting elements radially outwardly or radially inwardly, the changer device has a drive member which is rotatably movable about a central axis relative to the base. If this drive member is rotated, the adjusting elements are displaced inwardly and toward one another or outwardly and away from one another depending on the rotational direction. A gear mechanism is provided for converting the rotational movement of the drive member to the linear radial displacement or the pivotably movable radial displacement of the adjusting elements.

The design of the changer device with a drive member which is rotatable about the central axis makes it possible to increase the distance or the angle which the changer device covers from an unclamped state into a clamped state, by the adjusting elements being jointly moved from an external position into an internal position.

While a handle in the known changer devices is generally displaced by no more than 5 to 10 cm or is pivoted by no more than 10° to 15°, a rotatable drive member can be rotated by many revolutions in order to transfer the changer device and the adjusting elements thereof from the unclamped state into the clamped state. The required torque or the required force is correspondingly lower. The aforementioned gear mechanism of the changer device is preferably designed such that it requires at least one full revolution of the drive member in order to displace the adjusting elements between their external end position and their internal end position. Preferably, a plurality of revolutions are required therefor, preferably at least 5, in particular preferably at least 20.

The drive member can be fastened in turn to the base by means of a thread so that the described rotation of the drive member leads to a superimposed axial and rotational movement relative to the base. The axial component of this movement is used in order to act indirectly on the adjusting elements and thereby to achieve the radial displacement.

However, it is preferred if the drive member is exclusively rotatably movable relative to the base, i.e. is not itself displaceable in a translatory manner along a central axis. In such a case, it is preferred if the changer device has a sliding sleeve in addition to the drive member. This sliding sleeve is attached to the base in a manner which is translatory movable but fixed in terms of rotation. "Fixed in terms of rotation" in this context is understood to mean that the sliding sleeve is not fully freely rotatable on the base but a rotary end position is achieved after a maximum of one revolution. The sliding sleeve is in engagement with the exclusively rotatable drive member via a thread, so that the rotational movement of the drive member is transferred into an axial displacement of the sliding sleeve. This axial displacement of the sliding sleeve is transmitted in turn via a further part of the gear mechanism to the adjusting elements. The transmission can take place, for example, via a stop projection on the sliding sleeve, the sliding sleeve acting thereby on corresponding stop surfaces on the adjusting elements or on an intermediate member.

A further possible design of the gear mechanism of the changer device provides that the gear mechanism has at least one cam disc which is rotatable about the central axis of the changer device and which acts directly or indirectly on the adjusting elements. Such a cam disc can have, for example, three cams which are spaced apart from one another by 120° and which act on three adjusting elements by a rotational movement of the cam disc and thus control the radial movement thereof. The cam disc can be directly connected fixedly in terms of rotation to the drive sleeve. However, since this leads to a very high torque being required for clamping the clamping head, it is preferred if a step-down gear is provided between the drive sleeve and the cam disc, preferably with a step-down ratio of between 2:1 and 200:1.

A changer device according to the invention can be provided for the manual application of force. In such a case, preferably a rotary handle, for example in the manner of a crank, can be provided on the drive sleeve.

The possibility of coupling a rotational movement into the changer device via the drive sleeve and thereby displacing the adjusting elements radially, however, also makes it possible to provide the changer device with an electric drive unit. Such an electric drive unit has an electric motor with an output shaft which is coupled directly or indirectly to the drive member. The output shaft of the motor can act directly on the drive member or can even be integrally connected thereto. However, a step-down gear can also be provided here.

The electric motor can be supplied with power via a mains connection. In this case, the changer device has a corresponding connecting cable for connecting to a 110V/220V connection. It is advantageous, however, if the changer device has a preferably rechargeable battery for powering the electric motor. In particular, the use of rechargeable batteries which can be replaced without the use of tools is advantageous here.

The changer device with the electric motor preferably has at least one operating element, in particular a switch, which can be pushed from a neutral position in two opposing directions in order to operate the electric motor in corresponding opposing rotational directions. A design with two switches, one thereof controlling the rotational direction and the other being provided for energizing the electric motor, is also possible.

The changer device including the electric motor can be configured as a fixedly connected unit. This means that the electric motor cannot be separated from the remainder of the changer device and, in particular, from the base and the adjusting elements without the use of tools. Such a construction of the changer device permits a relatively small design.

The changer device, however, can also be configured as a modular changer device. The changer device then has at least two sub-units which can be brought into a coupled state with one another and separated from one another in a simple manner and preferably without the use of tools.

The first of these sub-units comprises at least the drive member, the gear mechanism for transferring the movement of the drive member to the adjusting elements, and the adjusting elements themselves. It thus comprises the substantially mechanical force-transmitting components of the system. Preferably, this first sub-unit is provided with an open side on the side remote from the adjusting elements, wherein this open side provides access to the drive member.

The second sub-unit comprises at least the electric motor, preferably additionally the aforementioned battery and optionally also a step-down gear.

The two sub-units are adapted to one another such that they can be brought into a coupled state. In this coupled state, the electric motor is at least indirectly coupled to the drive member. Preferably, to this end it can be provided that an output shaft of the second sub-unit is provided with a coupling contour, preferably with an internal or external polygon and the drive member or an intermediate part connected fixedly in terms of rotation thereto has a corresponding external or internal contour for the positive coupling and for transmitting torques.

The two sub-units are preferably adapted to one another such that their respective housings or the base and the stator of the electric motor are able to be connected together fixedly in terms of rotation, so that the drive torque of the motor does not rotate the sub-units as a whole relative to one another. This is not necessarily required, however.

In addition to the transmission of a torque from the second sub-unit to the first sub-unit, the coupling thereof, which is preferably possible without the use of tools, is preferably also provided such that the sub-unit is secured against separation in the direction of the central axis. As a result, after the clamping head has been transferred into the compressed state, it is possible to pull this clamping head out of the clamping chuck by a tensile force being introduced into the second sub-unit, the tensile force in turn acting on the first sub-unit and the clamping head coupled thereto.

BRIEF DESCRIPTION OF THE DRAWINGS

Further advantages and aspects of the invention are found in the claims and the following description of preferred exemplary embodiments of the invention which are explained hereinafter with reference to the figures.

DETAILED DESCRIPTION

Figure 1:
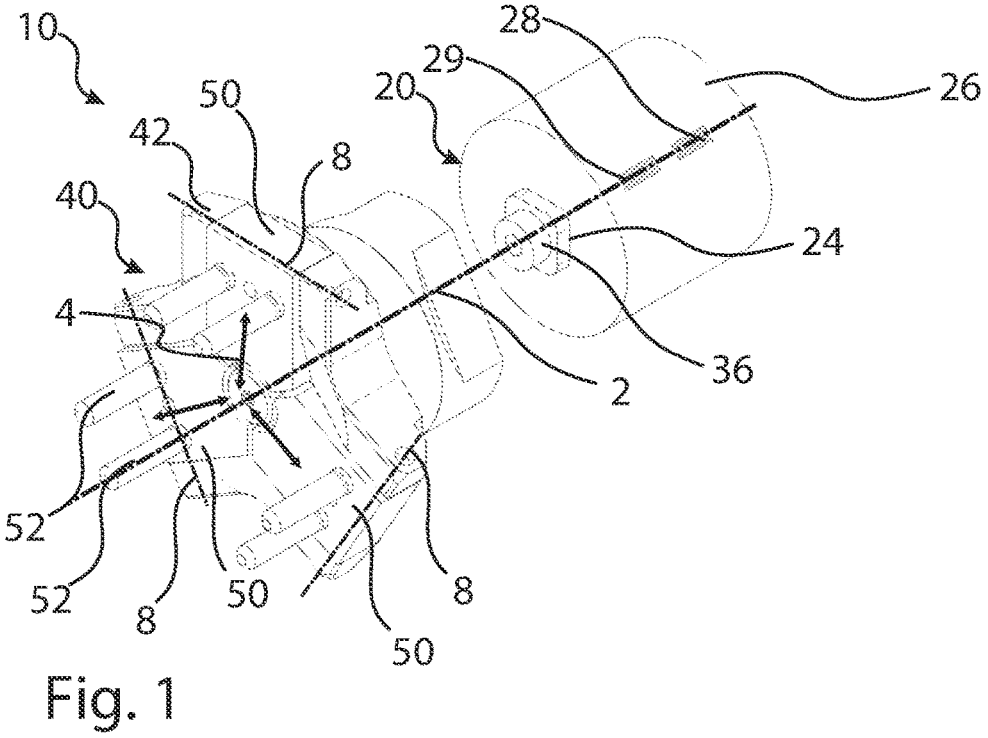
FIG. 1 shows a changer device consisting of two sub-units in a perspective view and not yet in the coupled state.

The figures show a changer device 10 according to the invention. This changer device 10 has two sub-units 20, 40 which are shown in FIG. 1 in the separated state and in FIG. 2 in the coupled state.

The changer device 10 serves for the purpose of pushing together the clamping jaws 104 of a clamping head 100 against a restoring force in order to produce thereby a compressed state of the clamping head. The restoring force can be produced, in particular, by elastomer blocks 106, the clamping jaws 104 being joined together thereby to form a ring.

In the compressed state, the clamping head 100 can be inserted into a clamping chuck, not shown. If the compressed state is released after the insertion, the clamping jaws 104 of the clamping head 100 move apart from one another so that with a holding edge 108 they engage behind a holding edge of the clamping chuck and are then secured against being pulled out.

The dismantling of the clamping head 100 from the chuck takes place in a similar manner. Similarly, in this case the clamping jaws 104 are pushed together by means of the changer device 10 so that the clamping jaws 104 are brought out of engagement with the holding edge of the clamping chuck. As soon as this occurs, the clamping head 100 can be released from the clamping chuck by being pulled out therefrom.

For the coupling and the application of force of the clamping head 100, the changer device 10 has on its first sub-unit 40 a total of six engagement portions 52, which are designed in the present case in the form of cylindrical pins which are inserted for the purpose of radial displacement into corresponding bores 110 on the clamping jaws 104 of the clamping head 100. In each case, two of these engagement portions 52 are provided on a common adjusting element 50.

The adjusting elements 50 are mutually movable in the radial direction corresponding to the arrows 4, wherein in each case they are jointly moved toward the central axis 2 or jointly moved apart from the central axis 4, preferably by a pivoting movement. The movement of the adjusting elements 50 and the engagement portions 52 toward one another leads to the described compression when the clamping head is coupled thereto.

Figure 3:
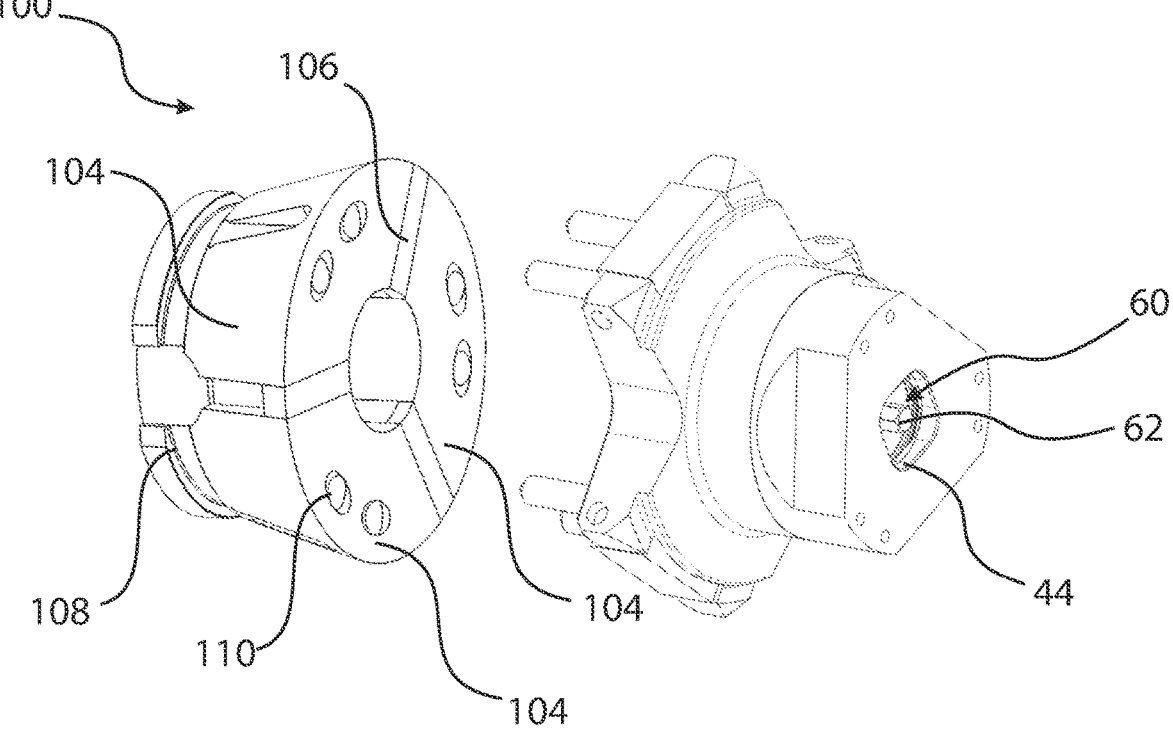
FIG. 3 shows the rear face of the first sub-unit of the changer device and a clamping head which can be brought into a compressed state as intended by the changer device for coupling to a clamping chuck.

In the present case, the adjusting elements 50 are attached in each case to a base 42 of the first sub-unit 40 so as to be pivotably movable about tangential pivot axes 8. For the purpose of their displacement, a rotationally movable drive member 60 is provided on the opposing side of the first sub-unit 40. This has a coupling contour 62 in the form of an external hexagon, as can be seen in FIG. 3.

If a rotational movement of the drive member 60 takes place relative to the base 42, this is forwarded via a gear mechanism to the adjusting elements 50, so that the adjusting elements and the engagement portions 52 fastened thereto are displaced radially inwardly or radially outwardly. This is explained below with reference to FIG. 4.

Figure 2:
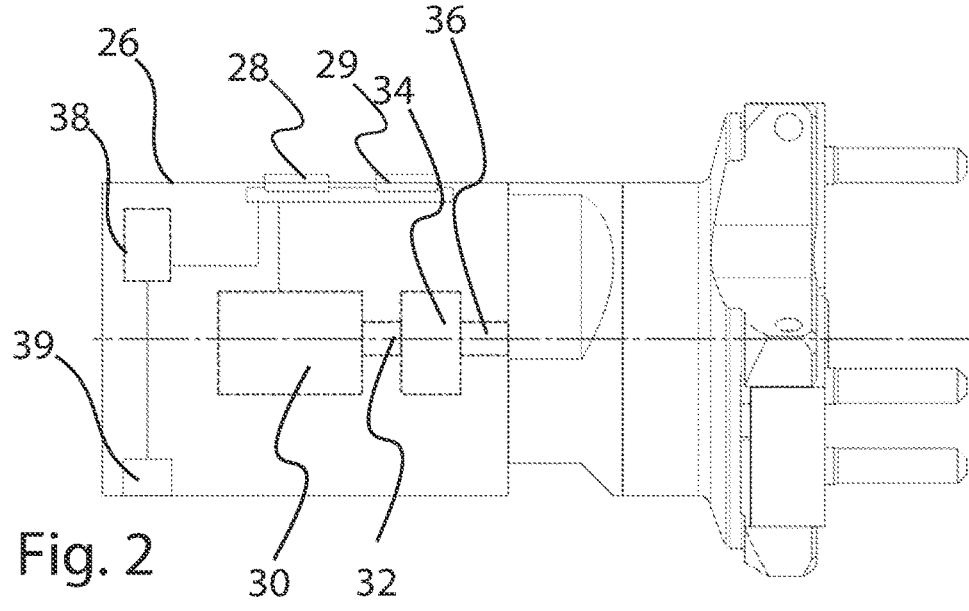
FIG. 2 shows the changer device in the coupled state of the sub-units in a side view.

In FIGS. 1 and 2 the second sub-unit 20 is also shown. While the first sub-unit 40 also represents the mechanical sub-unit and, in addition to the direct cooperation with the clamping head 100, carries out the main task of transferring the rotational movement of the drive member 60 in the radial direction of the adjusting elements 50, the second sub-unit 20 is primarily implemented by electrical components.

The second sub-unit 20 has a housing 26 which can be fastened fixedly in terms of rotation and preferably without the use of tools to the base 42 of the first sub-unit 40. For the purpose of the coupling, which is fixed in terms of rotation, corresponding non-circular contours 24, 44 are provided on the two sub-units 20, 40.

An electric motor 30 which is supplied with electrical energy by a rechargeable and/or replaceable battery 38 is provided inside the housing 26. Additionally or alternatively, the electric motor 30 can also be supplied with electrical energy via a power connection 39.

The output shaft 32 of the electric motor 30 is connected to a step-down gear 34. The output shaft 36 thereof in turn forms the output shaft 36 of the second sub-unit 20. This output shaft 36, as can be seen in FIG. 2, is provided with an internal hexagon in order to be connected fixedly in terms of rotation to the rotationally movable drive member 60 of the first sub-unit 40, when the two sub-units are connected together.

The second sub-unit 20 also has two switching elements 28, 29. A first switching element 28 serves for controlling the rotational direction of the electric motor 30. The second switching element 29 serves for activating and deactivating the electric motor 30.

As shown in FIG. 2 and as already mentioned above, the sub-units 20, 40 can be coupled together, wherein this coupling leads to a rotationally fixed attachment of the housing 26 to the base 42. Preferably, the sub-units 20, 40 are also secured against being pulled apart, for example by the contours 24, 44 having a corresponding shape or by additional coupling elements being provided therefor.

In the coupled state of FIG. 2, the output shaft 36 of the second sub-unit 20 is coupled to the coupling contour 62 on the drive member 60 of the first sub-unit 40. The electric motor 30 is thus able to rotate the drive member 60 relative to the base 42.

Figure 4:
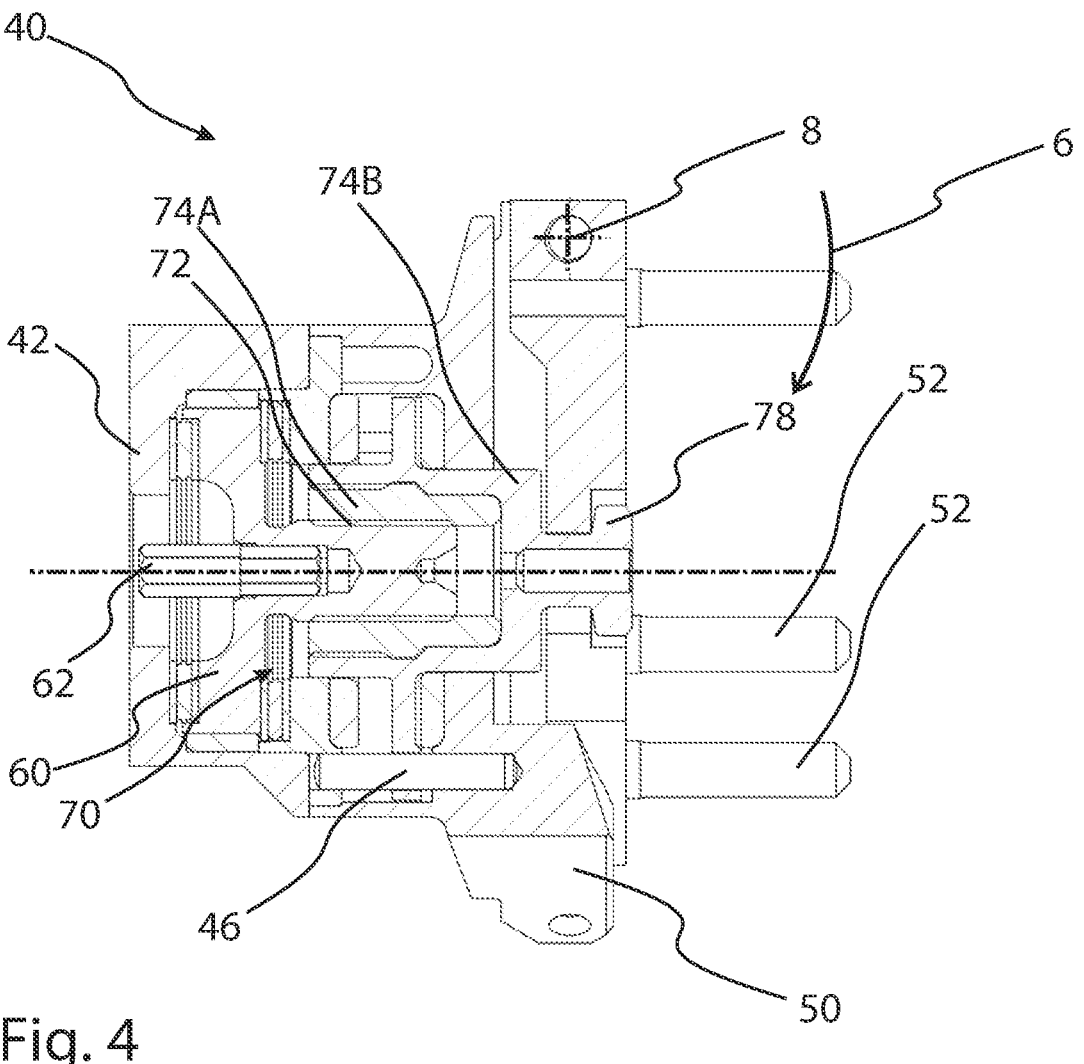
FIG. 4 shows the first sub-unit in a sectional view.

FIG. 4 illustrates how this rotation of the drive member 60 acts on the adjusting elements 50 and the engagement portions 52. The drive member 60 is rotatably mounted on the base 42 but not axially displaceable relative thereto. Via a threaded drive 72 the drive member 60 is in engagement with a two-part sliding sleeve 74A, 74B, the two elements 74A, 74B thereof being fixedly connected together. The sliding sleeve 74A, 74B is axially displaceable relative to the base 42 but secured against rotation by a securing pin 46. A rotational movement of the drive member 60 thus brings about an axial displacement of the sliding sleeve 74A, 74B.

An external element 74B of the sliding sleeve 74A, 74B acts on the adjusting elements 50 by means of an external annular projection 78. If the sliding sleeves 74A, 74B are displaced to the left relative to the perspective of FIG. 4, the pivotable adjusting elements 50 pivot inwardly with the engagement portions 52 as illustrated by the arrow 6.

If in this phase the clamping head 100 is coupled by means of the engagement portions 52 to the changer device 10, the clamping jaws 104 thereof are pushed toward one another and the clamping head 100 is compressed such that in this compressed state it can be inserted into a clamping chuck and removed therefrom.

This state of the clamping head 100, which is held on the first sub-unit 40 via the engagement portions 52, is also maintained when the second sub-unit 20 is separated from the first sub-unit 40, due to the self-locking of the threaded drive 72.

When removing the clamping head 100 from the clamping chuck, for example, this makes it possible to produce the compressed state with the two coupled sub-units 20, 40 of the changer device and then to release the second sub-unit, and to release the clamping head 100 jointly with the first sub-unit 40 from the clamping chuck only after the second sub-unit 20 has been separated from the first sub-unit 40.

Figure 5:
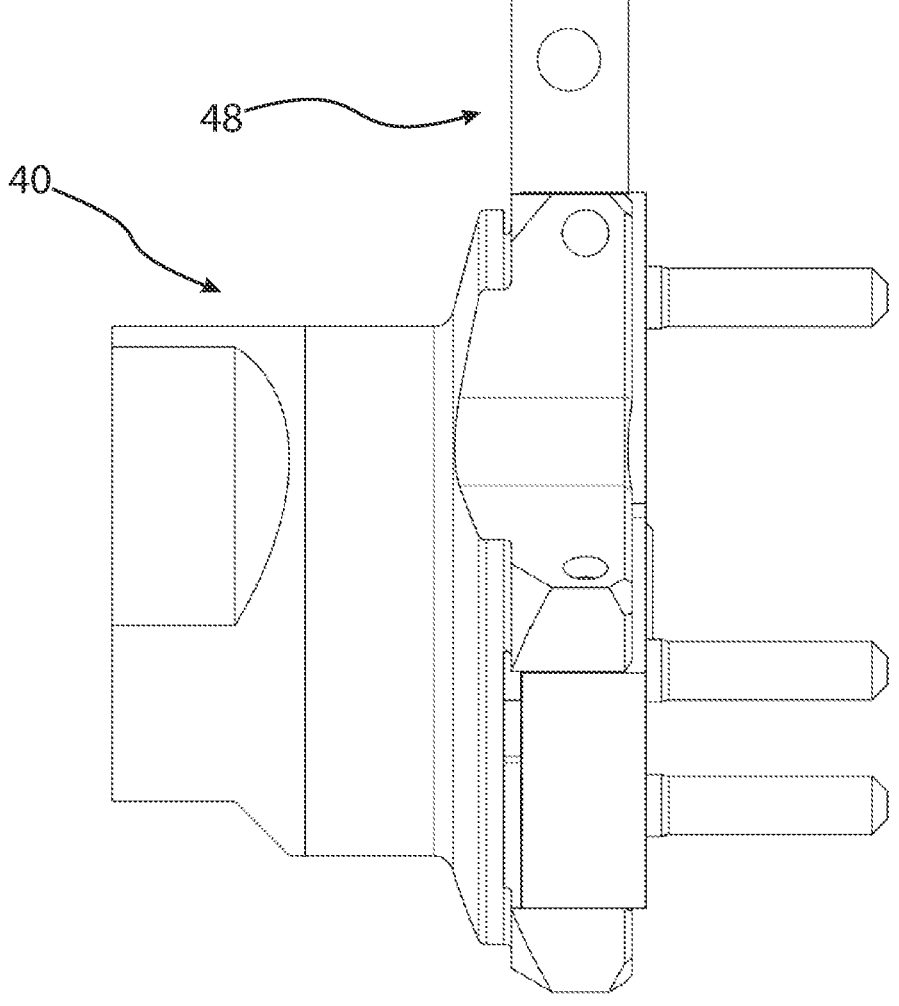
FIG. 5 shows an alternative embodiment of the first sub-unit.

FIG. 5 shows a variant of the first sub-unit 40 in which it is provided with a handle 48, in order to facilitate the handling of the clamping head 100 coupled thereto.

In the embodiment of the figures, the changer device 10 is configured as a modular device with the described two sub-units 20, 40. This is not necessary, however. An embodiment is also conceivable in which the two sub-units 20, 40 are fixedly connected together and only releasable from one another by means of a tool. In such a case, the output shaft 32 of the motor 30 or the output shaft 36 of the step-down gear 34 can be fixedly connected to the drive member 60.

The invention claimed is:

1. A changer device for a clamping head, the changer device being configured for inserting the clamping head into a clamping chuck and/or for removing the clamping head from the clamping chuck, wherein the clamping head has a plurality of clamping jaws which can be mutually displaced in a radial direction and which can be mutually subjected to force by the changer device toward one another or away from one another in the radial direction, the changer device comprising:
   a base;
   a plurality of adjusting elements which are movably attached to the base in a pivotable and/or translatory manner and which in each case have at least one engagement portion for application of force onto the plurality of clamping jaws; and
   a drive member which is rotatably movable about a central axis relative to the base;
   the drive member being coupled by gear mechanism to the plurality of adjusting elements so that by a rotational movement of the drive member the plurality of adjusting elements can be jointly moved toward one another or away from one another;
   wherein the gear mechanism has a sliding sleeve which is attached to the base in a manner which is translatory movable but fixed in terms of rotation and which is coupled to the drive member by a treaded drive; and
   wherein the sliding sleeve is coupled to the plurality of adjusting elements.

2. The changer device according to claim 1, wherein:
   the gear mechanism has at least one cam disc which is rotatable about the central axis; and
   the at least one cam disc acts directly or indirectly on the plurality of adjusting elements.

3. The changer device according to claim 1, further including:
   an electric drive unit;
   the electric drive unit having an electric motor with an output shaft which is coupled to the drive member.

4. The changer device according to claim 3, further including:
   a step-down gear between the output shaft of the electric motor and the drive member or between the drive member and the plurality of adjusting elements.

5. The changer device according to claim 3, further including:
   a battery for supplying power to the electric motor; and/or
   a button for activating electric motor; and/or
   a switch for reversing a rotational direction of the electric motor.

6. The changer device according to claim 4, wherein:
   the changer device is configured as a modular changer device and has at least two sub-units which can be brought into a coupled state with one another and separated from one another;
   a first one of the at least two sub-units comprising at least the drive member, the gear mechanism and the plurality of adjusting elements;
   a second one of the at least two sub-units comprising at least the electric motor; and
   the at least two sub-units being adapted to one another such that in the coupled state the electric motor is at least indirectly coupled to the drive member.

7. The changer device according to claim 6, wherein:
   the drive member has a coupling contour; and
   an output shaft of the second one of the at least two sub-units has a corresponding coupling contour.

8. The changer device according to claim 7, wherein:
   the second one of the at least two sub-units is able to be fixedly connected to the first one of the at least two sub-units in terms of rotation such that a stator of the electric motor and the base are fixed in terms of rotation to one another; and/or
   the second one of the at least two sub-units can be connected to the first one of the at least two sub-units such that the at least two sub-units are secured against separation in a direction of the central axis.

9. The changer device according to claim 7, wherein:
   the first one of the at least two sub-units has a handle for handling the first one of the at least two sub-units and a clamping head coupled thereto after uncoupling the second one of the at least two sub-units.

10. The changer device accoeding to claim 1, wherein:
   the plurality of adjusting elements comprises a total of three adjusting elements which can be jointly moved toward the central axis and away from the central axis; and/or
   the plurality of adjusting elements are configured as pivoting elements which in each case are attached to the base so as to be pivotably movable about a pivot axis; and/or
   the plurality of adjusting elements have engagement portions in the form of cylindrical pins.

11. The changer device according to claim 1, wherein:
   the sliding sleeve has a stop projection, the sliding sleeve acting thereby on stop surfaces on the plurality of adjusting elements or on an intermediate member.

12. The changer device according to claim 6, wherein:
   the second one of the at least two sub-units comprises at least one of a battery for supplying power to the electric motor and the step-down gear.

13. The changer device according to claim 2, wherein:
   the at least one cam disc is connected fixedly in terms of rotation to the drive member.

14. The changer device according claim 6, wherein:
   the at least two sub-units can be separated from one another without the use of tools.

15. The changer device according to claim 7, wherein:
   the coupling contour is in the form of an external or internal hexagon.

16. The changer device according to claim 10, wherein: each of the plurality of adjusting elements has at least two engagement portions in the form of cylindrical pins which extend in parallel.

\* \* \* \* \*